Dec. 14, 1926.
S. G. WINGQUIST
HYDRAULIC CHANGE SPEED GEAR
Filed March 18, 1924  3 Sheets-Sheet 1
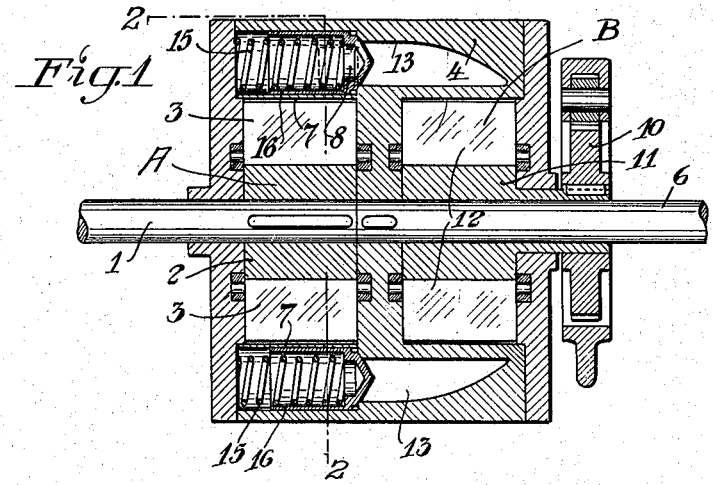
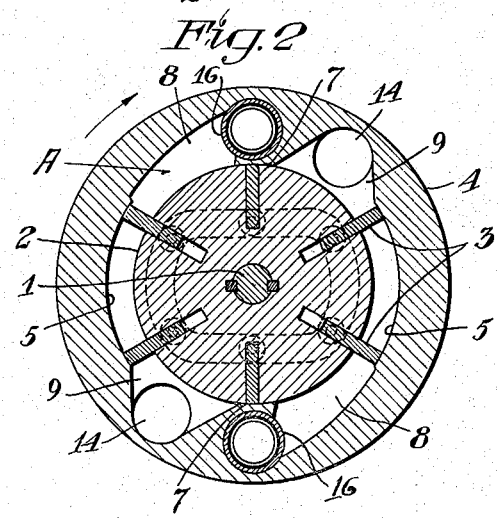
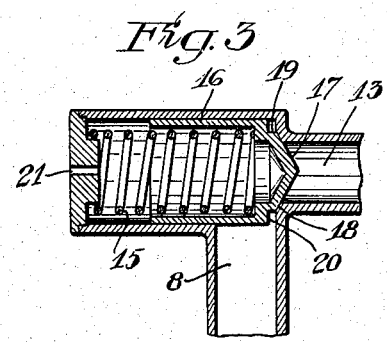
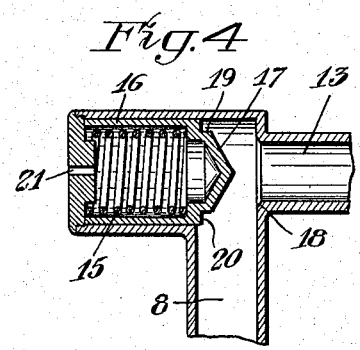
Inventor:
Sven Gustaf Wingquist
By Attys,
Fraser, Myers & Manley Dec. 14, 1926.
S. G. WINGQUIST
HYDRAULIC CHANGE SPEED GEAR
Filed March 18, 1924
1,610,405
3 Sheets-Sheet 2
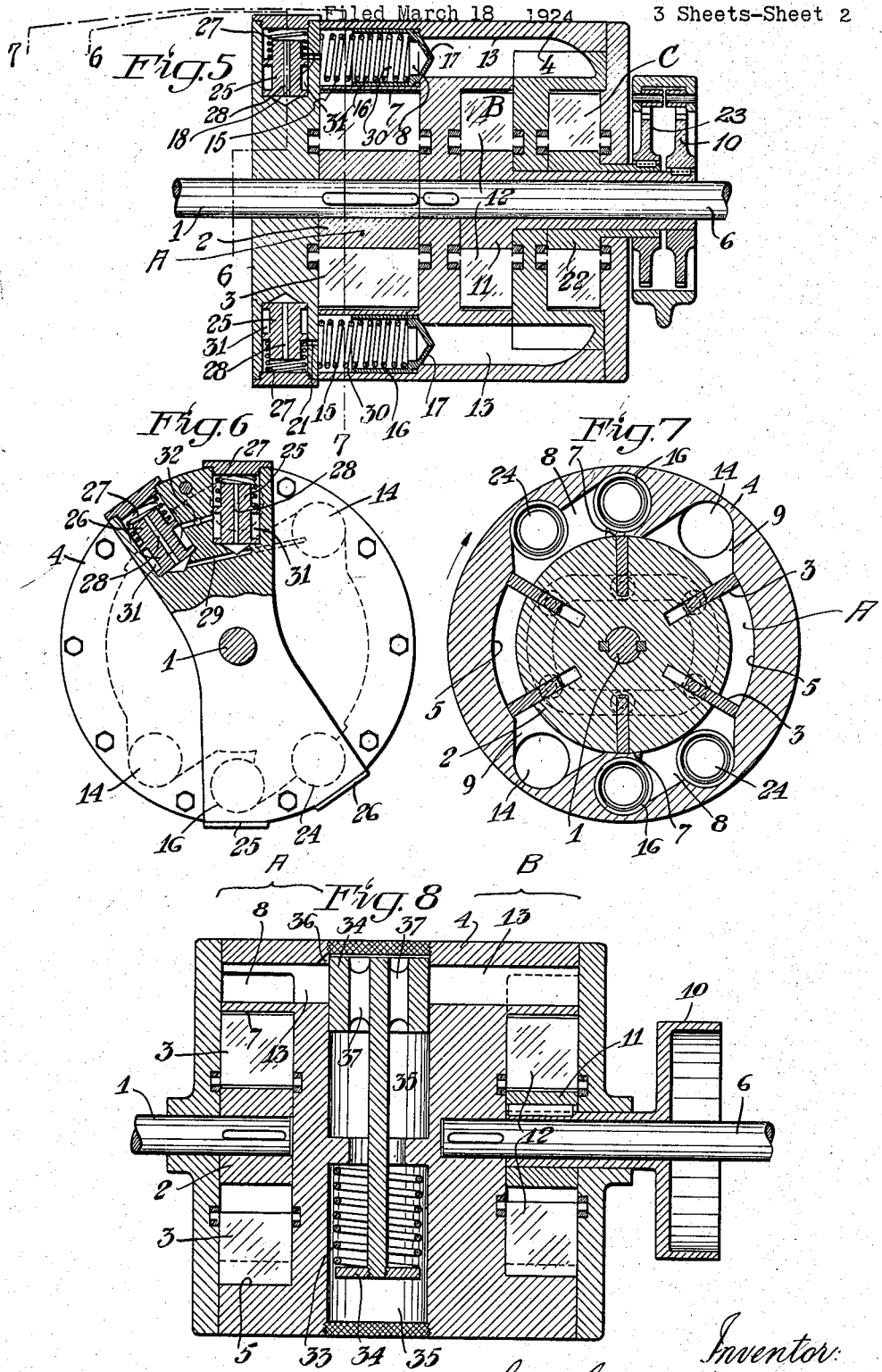
Inventor:
Sven Gustaf Wingquist
By Attys,
Fraser, Myers & Manley Dec. 14, 1926.  
S. G. WINGQUIST  
HYDRAULIC CHANGE SPEED GEAR  
Filed March 18, 1924
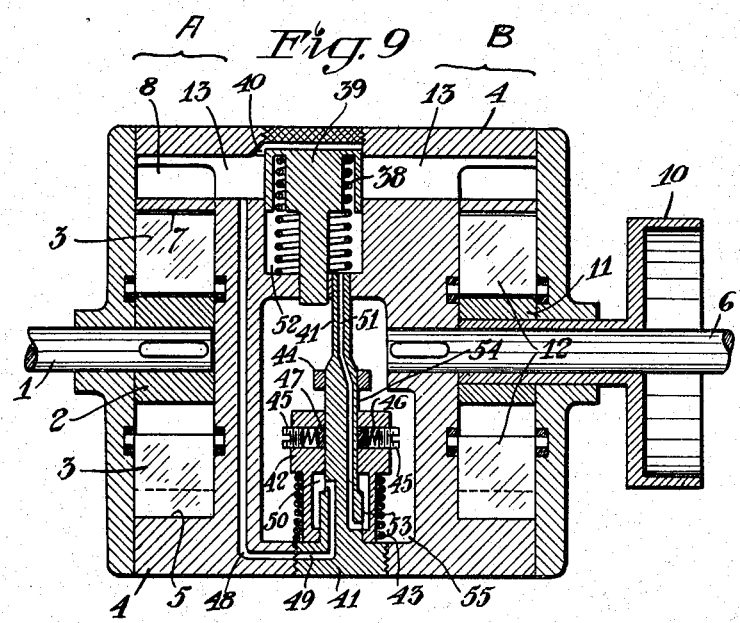
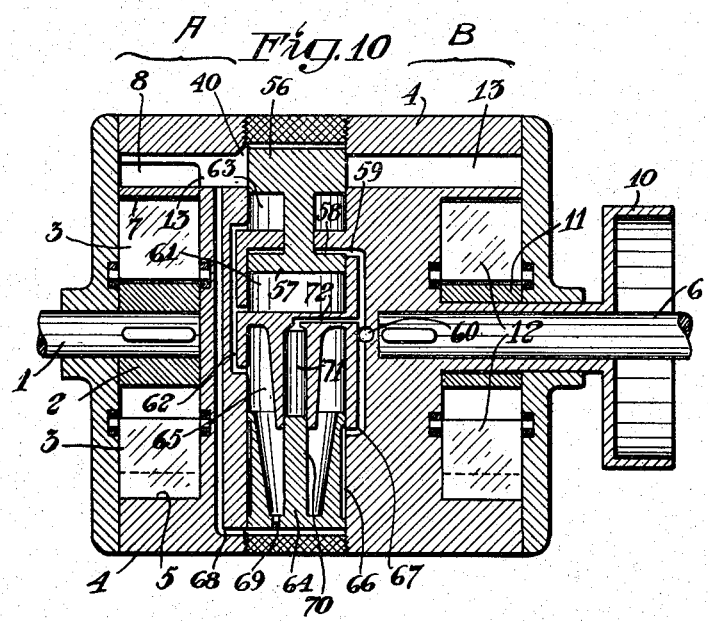

Patented Dec. 14, 1926.

1,610,405

UNITED STATES PATENT OFFICE.

SVEN GUSTAF WINGQUIST, OF GOTTENBORG, SWEDEN.

HYDRAULIC CHANGE-SPEED GEAR.

Application filed March 18, 1924, Serial No. 700,034, and in Sweden March 23, 1923.

This invention relates to hydraulic change speed gears comprising a delivery pump and one or more receiving pumps and having automatic transmission ratio controlling means, which are regulated by the pressure or speed conditions or both within the gear.

The object of the invention is to prevent in such change speed gears unnecessary and excessively frequent changes from one transmission ratio to another.

The invention consists, substantially, in that the automatic transmission ratio controlling means are so devised and arranged that they, after having opened the connections between the delivery pump and the receiving pump or pumps, to effect an increased transmission ratio, do not again shut off the said connections until after the conditions automatically regulating the transmission ratio have obtained such values as will insure, under a fairly uniform load, continuous running at the reduced transmission ratio obtained when said connections are shut off.

The controlling means, according to the present invention, may be actuated in a variety of ways. It may be actuated solely by the fluid pressure in the pressure chamber of the gear, the pressure being counterbalanced against the action of a spring or the like, or it may be actuated solely by the centrifugal force acting on an element partaking of the rotation of the driven or driving member of the gear counterbalanced against the action of a spring or the like, or it may be actuated by the combined effect of fluid pressure and centrifugal force.

In the first case, the controlling means may be so devised as to open the connections between the pumps of the gear to effect an increased transmission ratio when a certain pressure has been reached corresponding to a given load and to shut off said connections only after the pressure has fallen materially below that at which the increased ratio was first effected. The controlling means is so designed that the gear continues to work with the higher transmission ratio and does not again establish the primary transmission ratio until the pressure, due to a reduction in the torque load on the transmission, drops to a value, which will insure continuous running at such primary transmission ratio. Under normal operating conditions the usual small load variations will not thereafter create a sufficiently high pressure at any time to reset the gear at the higher transmission ratio, such shift to the higher ratio only thereafter occurring upon a substantial increase in the load.

In the second modification, the controlling means is arranged to establish connections between the pumps of the gear at a certain speed of rotation of the driven or driving member of the gear, and shut off the said connections at a different speed of rotation. In this case, the controlling means is, according to the invention, so devised that after cutting in a secondary transmission ratio, it does not again establish the primary transmission ratio until such a speed condition has been brought about that after reestablishing such primary ratio the change speed gear will not again change its ratio except upon a substantial speed variation due to materially altered conditions of operation.

The third modification constitutes in a certain sense a combination of the two above mentioned forms. In the present case the controlling means open the connections between the pumps at a certain pressure or a certain speed (obviously the actuating condition first obtaining will be the one, in a given instance, to effect the control) and shut off said connections at another pressure or another speed. The controlling means may also be devised to open the connections for a certain pressure at a certain speed, but for another pressure at another speed. In this case, the reestablishment of the primary ratio will not be effected until after the pressure and speed conditions have attained such values that after the restoring of the primary transmission ratio the pressure is lower than the corresponding opening pressure at the same speed.

In the accompanying drawings, various embodiments of a hydraulic change speed gear according to the present invention are shown. Fig. 1 is an axial section of a change speed gear comprising two pumps, between which valves actuated directly by the fluid pressure are arranged. Fig. 2 is a cross-section thereof along the line 2—2 of Fig. 1. Figs. 3 and 4 show the valve device on an enlarged scale in closed and open position, respectively. Fig. 5 is an axial section of a somewhat modified change speed gear comprising three pumps and having auxiliary valves controlled by centrifugal force. Fig. 6 is a cross-section along the line 6—6 of Fig. 5 and Fig. 7 a cross-section along the line 7—7 of the same figure. Fig. 8 is an axial section of a change speed gear comprising two pumps, between which a valve controlled directly by centrifugal force is arranged. Fig. 9 is an axial section of a change speed gear comprising two pumps, between which is arranged a valve controlled by the fluid pressure as well as by centrifugal force and by means of an auxiliary valve. Fig. 10 is an axial section of a similar somewhat modified change speed gear.

In the form of embodiment shown in Figs. 1 and 2, 1 designates a driving shaft, rigidly connected to a driving rotor 2 having radially movable working vanes 3 co-operating with working surfaces 5 provided in an outer closed housing 4. The housing 4, which is connected to a driven shaft 6 and forms the driven rotor of the gear, is provided with abutments 7 bearing tightly against the rotor body 2 and forming a partition between the pressure and suction or idle fluid chambers 8 and 9, respectively assuming the direction of rotation to be that shown by the arrow in Fig. 2. Provided in the housing 4 is, further, a stator 11 checked by means of a checking device 10 and provided with radially movable working vanes 12 and co-operating with abutments and working surfaces provided in the housing 4 in the same manner as is shown in Fig. 2 for the rotor 2 with the vanes 3. A change speed gear of the above type is more fully described in my U. S. Patent No. 1,510,368, patented September 30, 1924, which also relates particularly to an automatic stator releasing device. The two rotors 2 and 4 form in this manner a delivery pump A and the stator 11 together with the rotor 4 form a receiving pump B, pressure channels 13 and suction or idle fluid channels 14 being provided between said pumps. Provided in the pressure channels 13 are valves 16 controlled directly by the fluid pressure in the chambers 8 against the action of springs 15 and provided according to the invention in the embodiment shown, with a conical portion 17 bearing tightly in the closed position of the valve against a corresponding conical seat in the pressure channel 13 (Figs. 1 and 3) and shutting off the channel 13 from the pressure chamber 8. The conical portion 17 of the valve (Figs. 3 and 4) is provided with a cylindrical extension 19 having a less diameter than the valve body 16 proper, so that an annular surface 20 will be formed at the end, said annular surface being at all times exposed to the fluid pressure in the pressure chamber 8. By this means the active pressure surface of the valve when closed will be the said annular surface 20, while in the open position the said annular surface 20 and, in addition, the conical surface 17, comprise the active pressure surface. Consequently, a greater specific pressure will be required for opening the valve 16 against the spring 15 than for maintaining it open. The chamber to the left of the valve is connected by means of an opening 21 and a channel not shown with the idle fluid chamber of the gear to provide an outlet for fluid which might leak past the valve cylinder 16.

In order to make clear the hereinafter more particularly described mode of operation of the change speed gear shown in Figs. 1 to 4, it will be assumed that, when delivery pump A is delivering fluid to receiving pump B, a transmission ratio of 1:2 will be obtained between the shafts 6 and 1, whereas, when the connection between the pumps is closed, a direct drive will be obtained. Further, it will be assumed that the valves 16 with their springs 15 are designed to cut in the transmission ratio 1:2, when the pressure in the pressure chamber 8 of the change speed gear exceeds 8 kgs. per cm², and also it will be assumed that each kilogram of fluid pressure in the pressure chamber exerts on the driven shaft 6 of the gear a torque of 2 kilogrammeters, when the gear is adjusted for direct drive, or four kilogrammeters, when the gear is adjusted for the transmission ratio of 1:2.

Supposing the gear to be adjusted for direct drive and the torque load on the driven shaft 6 to be 16 kilogrammeters, the fluid pressure in the pressure chamber 8 will, under these circumstances, be 8 kgs. per cm². Now, for example, at one possible adjustment of the automatic valve control, if the load be increased to 16.4 kilogrammeters with the corresponding pressure increase to 8.2 kgs. per cm² the valves 16 will automatically connect pumps A and B to establish the transmission ratio of 1:2. As soon as this adjustment is effected, the pressure in the pressure chamber 8 will decrease to 4.1 kgs. per cm².

If now the automatic valves were arranged in any manner heretofore known, the pressure of 4.1 kgs. per cm² being considerably below the assumed valve actuating pressure of 8 kgs. per cm², would immediately again close the valves and thereby readjust the gear for direct drive. Then, an adjusting to the transmission ratio 1:2 would again be performed and so on, the change speed gear being adjusted incessantly from direct drive to the transmission ratio of 1:2, until finally the torque load on the driven shaft 6 of the gear by virtue of changed operating conditions reaches a value in excess of 32.8 kilogrammeters under which load the fluid pressure will always exceed 8.2 kgs. per cm² and the valve will at last be held steadily in its open position.

The mode of operation of the change speed gear according to the present invention as shown in Figs. 1 to 4 is as follows:

As long as the load on the shaft 6 is below a predetermined value, the shaft 1 drives the gear directly, the valves 16 remain closed, and the pump A works as a locked hydraulic clutch, whereas the stator 11 being released rotates freely with the housing 4. The pressure in the pressure chamber 8 of the gear is, under the above condition, solely dependent on the torque load on shaft 6. As heretofore described, the pressure also acts in this case, only on the annular surface 20 of the valves 16 and tends ineffectively to open the valves against the action of the springs 15. As long as the pressure is below that value which corresponds to the aforesaid predetermined load on the shaft 6, it cannot overcome the tension of the springs 15, and the valves 16 are retained in the closed position. If now the load on the shaft 6 be increased to such a value that the fluid pressure on the annular valve surfaces 20 is able to overcome the counter force of the springs, the valves will be somewhat opened and then the pressure will act on the whole circular end surface of the valves, on the annular surface 20 as well as on the conical portion 17. The springs will then be wholly compressed and the valves wholly opened (Fig. 4). At that time, the pump B will be cut in, the stator 11 will be braked by the checking device 10, and a certain increased transmission ratio will be obtained, due to the relation between the volumetric capacities of the two pumps. As the same time, the pressure in the pressure chamber 8 drops to a considerably lower value which is always determined by the load on the shaft 6 and by the transmission ratio. However, it is obvious that, because the new, lower pressure now acts on the whole end surface of the valves 16, the valves remain open, if the size of the said end surface is suitably chosen with relation to the size of the annular surface 20, the tension of the spring and the new transmission ratio. Likewise, the valves will not again shut off the connections between the pumps A and B, before the pressure has dropped to a value corresponding to such a small load on the shaft 6 that, providing the load is not thereafter greatly varied an uninterrupted direct drive will again be possible.

Further, it is to be observed that, when the valves again automatically shut off the connections because of the lower pressure, said pressure will, as soon as the valves are closed, again increase, due to the decreased transmission ratio, but as hereinbefore explained, such increased pressure no longer acts on the whole end surface of the valves, but on the annular surface 20 only and consequently a still further increase of the pressure must take place in order to again cause the valves to open. Such pressure increase is only brought about by an increase in the torque load.

The form of embodiment shown in Figs. 5 to 7 differs from that according to Figs. 1 to 4 in that an additional stator member 22 with appertaining checking device 23 and pressure controlled valves 24 has been added. Thus, the device consists in this case of three pumps A, B and C, respectively. The valves 24 of the pumps C, are similar to the valves 16 of the pump B, but are adapted to be actuated at a higher fluid pressure than that at which the valves 16 act, so that upon an increasing load on the shaft 6 first the pump B and then the pump C will be cut in. Further, in this form of embodiment there are provided in the driven rotor 4 radially movable auxiliary valves 25 and 26, one for each of the pressure controlled valves 16 and 24. The auxiliary valves 25 and 26 are held by means of springs 27 in their inner end positions and provide in this position through the channels 21 (Fig. 5), a central channel 28 in the valve body and a channel arrangement 29 (Fig. 6) a connection between the interior chamber 30 of the pressure controlled valves and the suction or idle fluid chamber of the change speed gear. When the auxiliary valves are in the above mentioned position, the actuation of the pressure controlled valves 16 and 24 is effected in the same manner as above described with reference to the form of embodiment shown in Figs. 1 to 4, i. e. in such manner that the establishing of higher transmission ratios takes place upon an increasing load on the shaft 6 resulting in an increased pressure in the pressure chambers 8, and the establishing of the lower transmission ratio or direct drive occurs only after the pressure has dropped sufficiently below the respective cutting in values of each valve to insure against an immediate reopening thereof.

If, then, the speed of rotation of the rotor 4 increases to a certain predetermined value, the centrifugal force of the one pair 25 of the auxiliary valves will overcome the tension of the springs 27, and the valves will be moved outwards to their outer end positions. If, then, the speed be still further increased, also the valves 26 will be moved in the same manner against the spring action to their outer end positions. In this position, a connection will be opened between the interior chamber 30 of the pressure controlled valves 16, 24 and the pressure chamber 8 of the gear through the channels 21, an annular chamber 31 formed by the auxiliary valves and their seat and a channel arrangement 32. Thus, the valves 16 and 24 will be exposed to the fluid pressure on both sides and because of the balancing of such opposed pressures are closed or remain closed by the springs 15 regardless of the transmission ratio or the pressure. Under such conditions a direct drive will always be effected, the stators 11 and 22 freely rotating with the housing 4.

The object of this arrangement is to prevent a reduced transmission ratio from being cut in, when the driving shaft 1 is rotating above a given number of R. P. M., for, if the driving power is taken from a modern high speed internal combustion engine, there would be danger of damage or excessive wear on the working vanes and of the parts guiding them in the transmission and furthermore, as long as the engine is running at high speed there could be no advantage in establishing a higher transmission ratio which, under a given load, would require the engine to still further increase its speed.

Obviously, it is possible to couple the change speed gears shown in Figs. 1 to 4 and 5 to 7, respectively, to the load and power source in a reverse manner in such a way that the shaft 6 will be the driving shaft and the shaft 1 the driven one. In the change speed gear according to Figs. 1 to 4 such a coupling would not effect any operative change whatever but would merely give rise to a different transmission ratio when pumps A and B are connected. The transmission shown in Figs. 5 to 7 will, besides, be changed in that respect that the movements of the auxiliary valves 25, 26 will be dependent on the number of revolutions per minute of the driving member instead of the driven member.

The form of embodiment shown in Fig. 8 differs from that according to Figs. 1 to 4 in that the pressure controlled valves 16 are replaced by a valve 34 controlled by centrifugal force against the action of a spring 33, said valve being provided in the pressure channel 13 between the two pumps A and B.

The valve 34 is movable radially in a recess 35 in the driven rotor 4, and the said recess is connected to the pressure chamber 8 of the gear through channels 36 and 37, so that the valve 34 will be perfectly balanced in respect to the fluid pressure. Thus, the valve is actuated by centrifugal force only and by the spring 33.

If it be assumed that the housing 4 rotates at a sufficiently reduced speed the pressure of the spring 33 is able to overcome the centrifugal force acting on the valve 34, and move it to its inner end position, the pumps A and B thereby being connected and a certain increased transmission ratio consequently established. As the centrifugal force acting on the valve is proportional to its radius of gyration, such force will be considerably smaller in the inner position at a given speed of the valve than in the outer position, and a considerably increased rotational velocity will be required to move the valve outwards against the action of the spring than will be required to maintain it in its outermost position. By suitably choosing the weight of the valve 34, its radius of gyration and the tension of the spring 33 the valve device may be brought to act, for instance according to the following example.

The change speed gear may be assumed to be designed for direct drive and a transmission ratio of 1:2, and the valve device is assumed to be so devised as to cut in the said transmission ratio, when the speed of the driving shaft 1 drops below 400 R. P. M.

If it be assumed that the gear is in direct drive running at 400 R. P. M. and if the load be increased to such an extent that the number of revolutions drops below 400 R. P. M., the transmission ratio 1:2 will be cut in automatically, since below 400 R. P. M. the spring 33 overcomes the centrifugal force exerted by the valve 34. The torque of the driving shaft 1 will, by the changed transmission ratio, be decreased to one half of the torque of the driven shaft 6, and the driving motor which may be, for instance, an internal combustion engine, will increase its speed to, for example, 600 R. P. M. corresponding to 300 R. P. M. of the driven shaft 6 at a transmission of 1:2. If, then, the load on the driven shaft 6 be decreased, its speed of revolution will again increase for instance to 310 R. P. M. and that of the driving shaft 1 to 620 R. P. M., at this speed the centrifugal force acting on the valve at its inner position attains a value sufficient to actuate the valve, moving it to its outer position and thereby reestablishing direct drive. As the torque load on the driving shaft 1 has been decreased, the internal combustion engine together with the driven shaft 6 is capable of running at a speed in excess of 400 R. P. M., say for instance 415 R. P. M., and, consequently, the gear continues to run in direct drive until a load causes its speed to again fall below 400 R. P. M.

Thus, the valve device is such as to cut in the transmission ratio 1:2 at a speed of the driving shaft below 400 R. P. M., and subsequently will maintain this ratio and will not again effect a direct drive, until the speed of said shaft exceeds 620 R. P. M., the attaining of which speed being an indication that the load has been sufficiently reduced to permit continuous running in direct drive.

The form of embodiment shown in Fig. 9 consists, as does that according to Figs. 1, 2 and 8, of two pumps A and B. Provided in the pressure channel 13 between the said two pumps there is, however, in this case a valve 39 controlled by the fluid pressure in the pressure chamber 8 against the action of a spring 38 and also by centrifugal force, the outer end of said valve being connected with the pressure chamber by means of a channel 40. Secured into the housing 4, in a radial direction, is further a spindle 41, movable on which, is an auxiliary valve 42 actuated inwardly by a spring 43 and also by the fluid pressure as will be described below. In the outward direction the centrifugal force acts, which at a certain number of R. P. M. overcomes the tension of the spring 43 and the fluid pressure, so that the auxiliary valve will be moved outwards to its outer limit position. The inward movement of the auxiliary valve 42 is limited by an abutment 44 provided on the spindle 41. Said movement is also resisted by two braking devices provided in the auxiliary valve and consisting of springs 46 adjustable by means of screws 45 and acting on braking blocks 47 bearing against the spindle 41. In the outer position of the auxiliary valve 42, shown in Fig. 9, said valve opens, through channels 48, 49, an annular recess 50 in the auxiliary valve and a channel 51 in the spindle 41, a connection between the pressure chamber of the gear and the chamber 52 on the inside of the main valve 39, which will, thus, be balanced by the fluid pressure and is moved to or held in its outer, closed position by the action of the spring 38 and centrifugal force independent of the magnitude of the fluid pressure.

As apparent from Fig. 9, that portion of the spindle 41, on which the auxiliary valve is movable, has a somewhat greater diameter at 53 than at 54. Thus, the interior chamber 50 of the auxiliary valve 42 will have an inner annular end surface of greater area than its outer, likewise annular end surface, so that the pressure fluid, which is admitted to said chamber 50 through the channels 48 and 49, tends to assist the spring 43 in moving the auxiliary valve 42 inwards against the abutment 44. In this inner position there is effected through the channel 51 in the spindle 41 a connection between the chamber 52 on the inside of the main valve 39 and the chamber 55 surrounding the auxiliary valve which chamber is always connected to the suction or idle fluid chamber of the gear, the connection being established by the lower portion of valve member 42 uncovering the port at the lower end of channel 51. Thus, in this inner position of the auxiliary valve 42 the main valve 39 is exposed to the fluid pressure on its outer side only and will open the connection between the two pumps A and B at a certain pressure and a certain number of revolutions of the driven rotor 4.

The main valve 39 acts independently at a low number of R. P. M., when the centrifugal force is small and the auxiliary valve 42 at its inner limit position does not affect its operation in any way. When the pressure exceeds a certain limit, the connection between the two pumps A and B is opened by valve 39 in a manner heretofore described. In this case the pressure on the outer side of the valve 39 has to overcome the centrifugal force of the valve, the tension of the spring 38 and also the friction between the valve and its seat. At the time of opening the valve 39 is exposed to an unbalanced side pressure in the longitudinal direction of the channel 13, and, consequently, the frictional resistance, starting friction, is relatively great compared with the centrifugal force in the outer position of the valve. As soon as the valve has opened the connection between the two branches of the channel 13, it will be balanced by the fluid pressure, the one-sided fluid pressure being removed, since in this case also the right hand branch of the channel 13 will be exposed to the said pressure. The valve continues to move inwards, though the pressure drops as heretofore explained, because the pressure has now only to overcome the spring tension and the centrifugal force which continuously decreases as the radius of gyration of the valve is shortened. The inward movement of the valve is also facilitated by the fact that the number of R. P. M. of the rotor 4 has decreased through the change in transmission ratio, and a considerably less friction is encountered when the valve is in motion. When the valve has reached its inner limit position, it is there retained, until the pressure has dropped to such a low value that the centrifugal force and the spring tension combined are capable of overcoming the fluid pressure acting on the outer end surface of the valve and the resistance of starting friction. By suitably choosing the centrifugal force and the stroke of the valve and the magnitude of the spring tension and the friction a condition will be obtained in which, below and up to a certain number of R. P. M. of the driving shaft 1, the main valve 39 will open the connection between the pumps A and B at a certain pressure and will only shut off said connection at a sufficiently lowered pressure to insure continuous running with direct drive. It is obvious that if the stroke be made sufficiently great to increase the difference in the centrifugal force acting on the valve in its inner and outer positions and the spring comparatively weak with relation to the other forces, the friction will be of correspondingly greater account, and the valve 39 may in this case be made to act independently of the auxiliary valve 42 to accomplish under any predetermined conditions that which is, according to the present arrangement, accomplished by such auxiliary valve.

However, in the form of embodiment shown, control is effected, at a number of R. P. M. in excess of a predetermined speed, by means of the auxiliary valve 42, acting, substantially, in the same manner as does the main valve 39. The only difference being that the spring 43 assists the fluid pressure and that the friction is considerably greater, due to the braking means 47, and, consequently, the stroke need not be made so great, the increased friction serving the same purpose as an increased difference in the radius of gyration of the valve in its inner and outer position. In the inner position the centrifugal force is in this case counter-acted by the spring 43 and also by the relatively large friction, and, thus, the decreasing of the pressure may, if desired, be carried very far, without the auxiliary valve being caused to move to its outer position and causing the main valve to shut off the connection.

The controlling work may be performed by the auxiliary valve 42 in combination with a main valve according to Fig. 9, which main valve in this case has such a large stroke that after an inward adjustment or actuation the centrifugal force, which through the decreasing of the number of R. P. M. of the driven rotor 4 and also on account of the decreased radius of gyration of said valve, due to its inward movement, is not able to overcome the decreased pressure resulting from said actuation. The auxiliary valve device may also be used in combination with other types of hydraulically controlled valves, for instance according to the form of embodiment shown in Fig. 10.

The said form of embodiment differs from that according to Fig. 9 only in respect to the constructional form of the main and auxiliary valves.

The main valve 56 is here provided with a plunger 57 moving in a separate cylinder, the chamber 58 of which at the outer side of the plunger 57 is connected permanently with the suction chamber of the gear through the channels 59, 60. The chamber 61 at the inner side of the plunger is connected by means of a channel 62 with the chamber 63 at the inner end of the main valve 56 and also with the chamber 65 containing the auxiliary valve 64.

Permanently connected with the suction chamber of the gear through a channel 67 and the channel 60 is an annular chamber 66 formed by a recess in the auxiliary valve 64 and its seat. The chamber 65 containing the auxiliary valve is connected with the pressure chamber 8 of the gear through channels 68 and 69, so that the auxiliary valve will be acted on by the fluid pressure also at the inner side.

Further, the auxiliary valve 64 is provided with a cylindrical plunger 70 entering into a bore 71 in the rotor 4, said bore being connected with the suction chamber by a channel 72 and the channel 60. Thus, the active pressure surface at the outer side of the auxiliary valve is greater than the active pressure surface at the inner side, so that the pressure tends to move the auxiliary valve inwards against the action of the centrifugal force.

In the outer position of the auxiliary valve 64 shown, the connection between the pressure chamber 8 and the chambers 63 and 61 at the inside of the main valve 56 and its plunger 57, respectively, is open through the channels 68, 69 and 62. Thus, the main valve 56 is held closed by the pressure difference at each side of the plunger 57 and also by centrifugal force. If the pressure be increased, or if the speed of the driven rotor 4 be decreased, the pressure difference at the outer side and the inner one of the auxiliary valve 64 is capable of overcoming the centrifugal force, and the auxiliary valve is moved to its inner limit position and opens, through the channels 60, 67, the annular chamber 66 and the channel 62, the connection between the suction chamber of the gear and the chambers 63 and 61 at the inner side of the main valve 56 and its plunger 57, respectively. Consequently, the main valve 56 is moved inwards by the fluid pressure acting on its outer side only through the channel 40 and performs the cutting in of the pump B.

At this moment, the pressure in the pressure chamber 8 drops, as hereinbefore explained, but the auxiliary valve does not move back to its outer position and perform, immediately, a restoring of the valve 56, because the auxiliary valve 64, its plunger 70 and its stroke, can be designed so that to move back the auxiliary valve to its outer position there is required a reduction in pressure materially below that value, which was required initially to move the valve to its inner position. In this case, also, the reduction of centrifugal force of the valve due to the decreasing of the speed of rotor 4, when cutting in the pump B is of material assistance in securing the desired result.

I do not claim certain features of the hydraulic transmission devices hereinbefore described, as such features are claimed in my co-pending United States applications Serial No. 418,264, filed October 20, 1920; No. 575,673, filed July 17, 1922; No. 621,577, filed February 27, 1923; No. 688,248, filed January 24, 1924; and in my United States Patents No. 1,503,618, issued August 5, 1924; No. 1,510,368, issued September 30, 1924 and No. 1,599,626, issued September 14, 1926.

While the preferred embodiment of the invention together with numerous modifications thereof have been hereinbefore fully described, I wish it to be understood that the invention may be otherwise variously embodied or modified without departing from the spirit of the invention, as set forth in the following claims.

What I claim as new and desire to secure by Letters Patent of the United States of America is:—

1. An automatic transmission ratio control for hydraulic coupling and change speed gears of the type having delivery and receiving pumps, comprising valve means for determining the flow of fluid between said pumps and automatic means for opening said valve means at one ratio of power to load-torque and closing said valve means at another materially different ratio of power to load-torque.

2. An automatic transmission ratio control for hydraulic coupling and change speed gears having delivery and receiving pumps, comprising valve means for determining the flow of fluid between said pumps, and automatic means for opening said valve means, when operating conditions indicating the desirability for an increased transmission ratio have been reached, and for maintaining said valve means open over a predetermined range of variation in said conditions, which range includes conditions which would be incapable of opening said valve means if applied to such valve means in the closed position.

3. An automatic transmission ratio control for hydraulic coupling and change speed gears having delivery and receiving pumps, comprising valve means for determining the flow of fluid between said pumps, and automatic means for opening said valve means when a predetermined driving torque has been reached and for maintaining said valve means open over a range of torque variation materially below the torque initially required to open said valve means.

4. An automatic transmission ratio control for hydraulic coupling and change speed gears having delivery and receiving pumps, comprising valve means for determining the flow of fluid between said pumps, and automatic means for opening said valve means when the fluid pressure within the change speed gear has attained a certain value, and for maintaining said valve means open over a range of pressure variation falling materially below the pressure required initially to open said valve means.

5. An automatic transmission ratio control for hydraulic coupling and change speed gears of the type having delivery and receiving pumps, comprising valve means for determining the flow of fluid between said pumps and automatic means for opening said valve means at one ratio of power to load-torque and closing said valve means at another materially different ratio of power to load-torque and auxiliary control means adapted to prevent the actuation of said valve means under operating conditions which, acting solely on the said automatic means, would have effected the opening of said valve means.

6. An automatic transmission ratio control for hydraulic coupling and change speed gears of the type having delivery and receiving pumps, comprising valve means for determining the flow of fluid between said pumps and automatic means for opening said valve means at one ratio of power to load-torque and closing said valve means at another materially different ratio of power to load-torque, and auxiliary means, rotated by a member of the gear and sensitive to centrifugal force, adapted to prevent the opening of said valve means at speeds in excess of a certain predetermined value.

7. An automatic transmission ratio control for hydraulic coupling and change speed gears having delivery and receiving pumps, comprising valve means for determining the flow of fluid between said pumps, and automatic, pressure-sensitive, spring-ballasted means for opening said valve means at a certain fluid pressure and for again closing said valve means by spring action, but only after the said pressure has dropped to a value which, when the valve is closed results in a pressure insufficient to reopen such valve.

8. An automatic transmission ratio control for hydraulic coupling and change speed gears having delivery and receiving pumps, comprising valve means for determining the flow of fluid between said pumps, automatic means for actuating said valve means, and auxiliary means rotated by a member of the gear and sensitive to centrifugal force for closing or maintaining closed said valve means when said gear member exceeds a certain rotative velocity.

9. An automatic transmission ratio control for hydraulic coupling and change speed gears having delivery and receiving pumps, comprising valve means for determining the flow of fluid between said pumps, and automatic pressure sensitive means for opening said valve means, said automatic means offering a larger active pressure surface in the position in which it has opened said valve means than in the position in which said valve means are closed.

10. A valve for automatic transmission ratio control for hydraulic coupling and change speed gears of the type in which both delivery and receiving pumps are employed, said valve comprising a port and a sliding member for opening and closing said port, said sliding member being sensitive to fluid pressure and adapted to expose a greater active pressure area to said fluid pressure when in the position opening said port than when in the position closing said port.

In testimony whereof I hereunto affix my signature.

SVEN GUSTAF WINGQUIST.